United States Patent [19]

Miura et al.

[11] Patent Number: 5,345,343

[45] Date of Patent: Sep. 6, 1994

[54] POWER SAVING SYSTEM FOR FILE PROTECT AND DISK CAPACITY SENSORS IN ROTATING DISK DATA STORAGE APPARATUS

[75] Inventors: Tohru Miura, Chofu; Hiroshi Tsuyuguchi, Tokyo, both of Japan

[73] Assignee: Teac Corp., Tokyo, Japan

[21] Appl. No.: 49,562

[22] Filed: Apr. 19, 1993

[30] Foreign Application Priority Data

Apr. 20, 1992 [JP] Japan .................................. 4-126801

[51] Int. Cl.$^5$ .................................. G11B 15/04; G11B 15/18
[52] U.S. Cl. .................................. 360/60; 360/69
[58] Field of Search .................... 360/60, 61, 69, 70

[56] References Cited

U.S. PATENT DOCUMENTS

| | | | |
|---|---|---|---|
| 4,626,942 | 12/1986 | Shoji | 360/70 |
| 4,658,307 | 4/1987 | Tsuyuguchi et al. | 360/69 |
| 4,737,867 | 4/1988 | Ishikawa et al. | 360/61 |
| 5,155,638 | 10/1992 | Aikawa et al. | 360/69 |

*Primary Examiner*—Donald Hajec
*Assistant Examiner*—Won Tae C. Kim
*Attorney, Agent, or Firm*—Woodcock Washburn Kurtz Mackiewicz & Norris

[57] ABSTRACT

A flexible magnetic disk drive is disclosed which operates under the control of a host system. A CMOS inverter is employed as a power saving switch, holding a file protect sensor energized only when the standard "drive select" signal from the host commands operation of the disk drive. Another CMOS inverter is provided for two disk capacity a sensors which provide signals indicative of the data storage capacity of the loaded disk cartridge. The disk capacity sensors are energized only when the drive select signal commands operation of the disk drive and when the standard "motor on" signal dictates rotation of a disk drive motor.

12 Claims, 3 Drawing Sheets

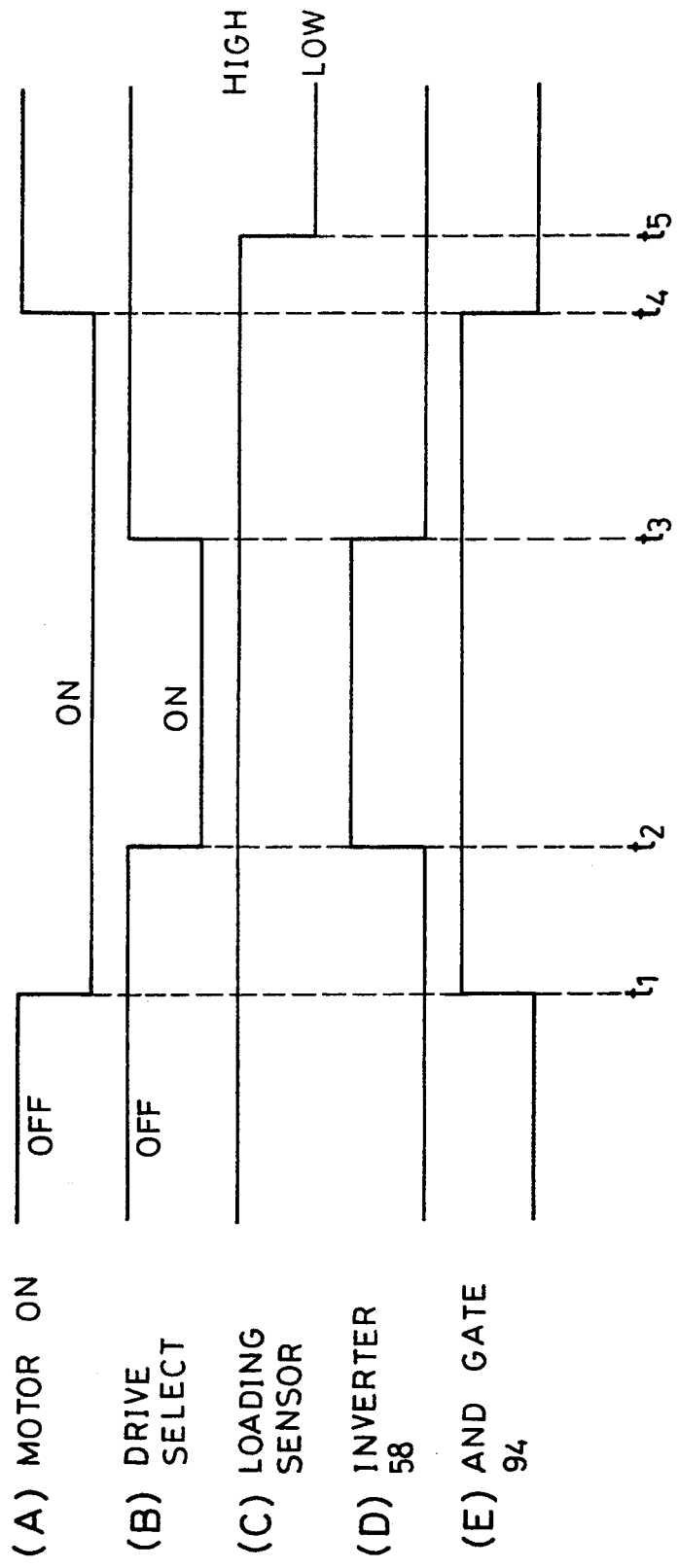

POWER SAVING SYSTEM FOR FILE PROTECT AND DISK CAPACITY SENSORS IN ROTATING DISK DATA STORAGE APPARATUS

BACKGROUND OF THE INVENTION

This invention relates to apparatus for data transfer with a rotating magnetic disk, particularly a flexible magnetic disk, which is normally packaged in cartridge form. More particularly, the invention pertains to a system for saving power consumed by a sensor or sensors incorporated in such rotating disk data storage apparatus.

Various power saving schemes have been suggested and used with floppy disk drives. Among such conventional suggestions is that described and claimed in U.S. Pat. No. 4,658,307 filed by Tsuyuguchi et al. and assigned to the assignee of the instant application. Tsuyuguchi et al. teaches to connect the disk motor drive circuit, the head motor drive circuit, and the read/write circuit, all standard components of the disk drive, to a power supply via a power saving switch. This switch is closed only when the floppy disk cartridge is loaded in the disk drive. The motor drive circuits and read/write circuit are therefore not powered in the absence of the disk cartridge, even if the complete data processing system, comprising a host and one or more disk drives, is powered on. A very substantial saving of power can thus be accomplished.

As far as the applicant is aware, however, various sensors customarily incorporated in disk drives were conventionally held powered even when the disk drive was standing by, that is, when the associated drive select signal was not commanding the operation of that disk drive. Such sensors include a file protect sensor for sensing whether the loaded disk cartridge is protected against erasure or writing, a disk capacity sensor for discriminating between one-megabyte and two-megabyte disk, and another disk capacity sensor for discriminating between four-megabyte and other capacity disks.

Admittedly, the sensors and associated circuitry demand no inordinately large power, the current flowing through each sensor being one milliampere or so. However, now that the power requirements of other power consuming parts of the disk drive have been reduced to a minimum, the saving of power consumed by the sensors has become imperative in view of strong, consistent demands from the users for less power consuming disk drives.

SUMMARY OF THE INVENTION

The present invention aims at the provision of a novel power saving system for a sensor or sensors in rotating disk data storage apparatus of the kind defined.

Briefly, the invention concerns an apparatus for data transfer with a replaceable disk cartridge under the control of a host system, the disk cartridge having a data storage disk rotatably housed in a protective envelope bearing a file protect mark indicative of whether the disk is protected or unprotected against writing.

More specifically, the invention deals with a power saving system in such an apparatus, comprising file protect sensor means for electrically sensing whether the disk cartridge is protected or unprotected against writing, input means for inputting from the host system a drive select signal having a first state for holding the apparatus in operation, and a second state for holding the apparatus out of operation, and power saving means connected between the file protect sensor means and the input means for holding the file protect sensor means electrically energized when the drive select signal is in the first state, and unenergized when the drive select signal is in the second state.

The invention also provides a power saving system for disk capacity sensor means which senses the data storage capacity of the disk cartridge from a disk capacity mark thereon. The system comprises first a input means for inputting from the host system a drive select signal having a first state for holding the apparatus in operation, and a second state for holding the apparatus out of operation, second input means for inputting from the host system a motor on signal having a first state for holding the disk in rotation, and a second state for holding the disk out of rotation, and power saving means connected between the disk capacity sensor means and the first and the second input means for holding the disk capacity sensor means electrically energized when the drive select signal is in the first state and when the motor on signal is in the first state, and unenergized when the drive select signal is in the second state and, at the same time, when the motor on signal is in the second state.

The above and other features and advantages of this invention and the manner of realizing them will become more apparent, and the invention itself will best be understood, from a study of the following description and appended claims, with reference had to the attached drawings showing a preferred embodiment of the invention.

BRIEF DESCRIPTION OF THE DRAWINGS

FIG. 4, consisting of (A) through (E), shows in timed relationship to one another the waveforms appearing in various parts of the FIG. 1 system.

DESCRIPTION OF THE PREFERRED EMBODIMENT

Figure 1:
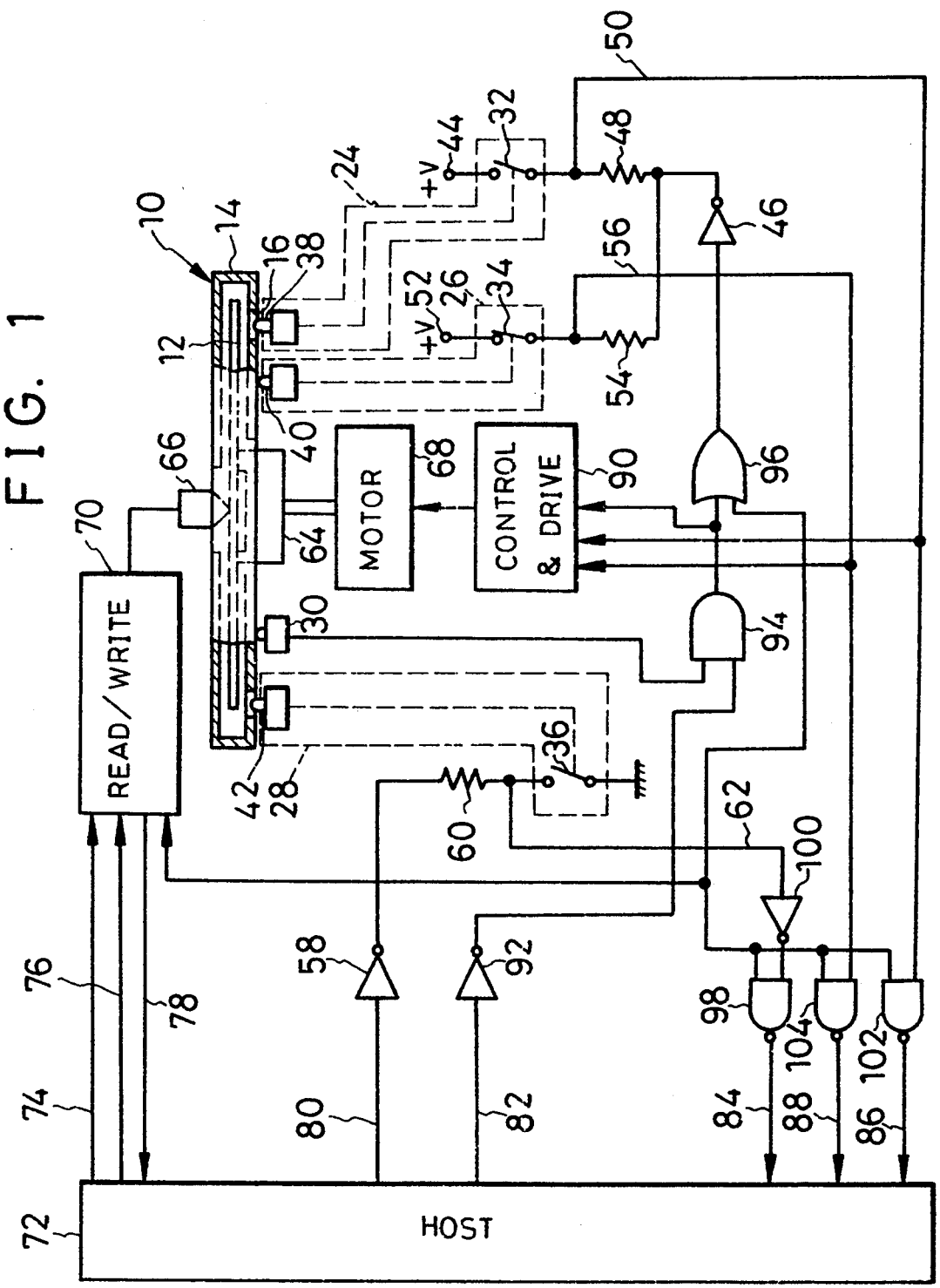
FIG. 1 is a combined pictorial and block diagrammatic illustration of a flexible magnetic disk drive incorporating the principles of the invention, the disk drive being shown together with a host system.

The invention will now be described in detail as embodied in a disk drive for use with flexible magnetic disk cartridges having disks of three and a half inch diameter, one of the standard disk sizes, and of various storage capacities commercially available today. FIG. 1 shows the disk drive loaded with a two-megabyte disk cartridge 10 which is better illustrated in FIG. 2. The disk drive is adapted for interchangeable use with a four-megabyte disk cartridge 10a, shown in FIG. 3, and with a one-megabyte disk cartridge, not shown, as well as with disk cartridges of other capacities.

Figure 2:
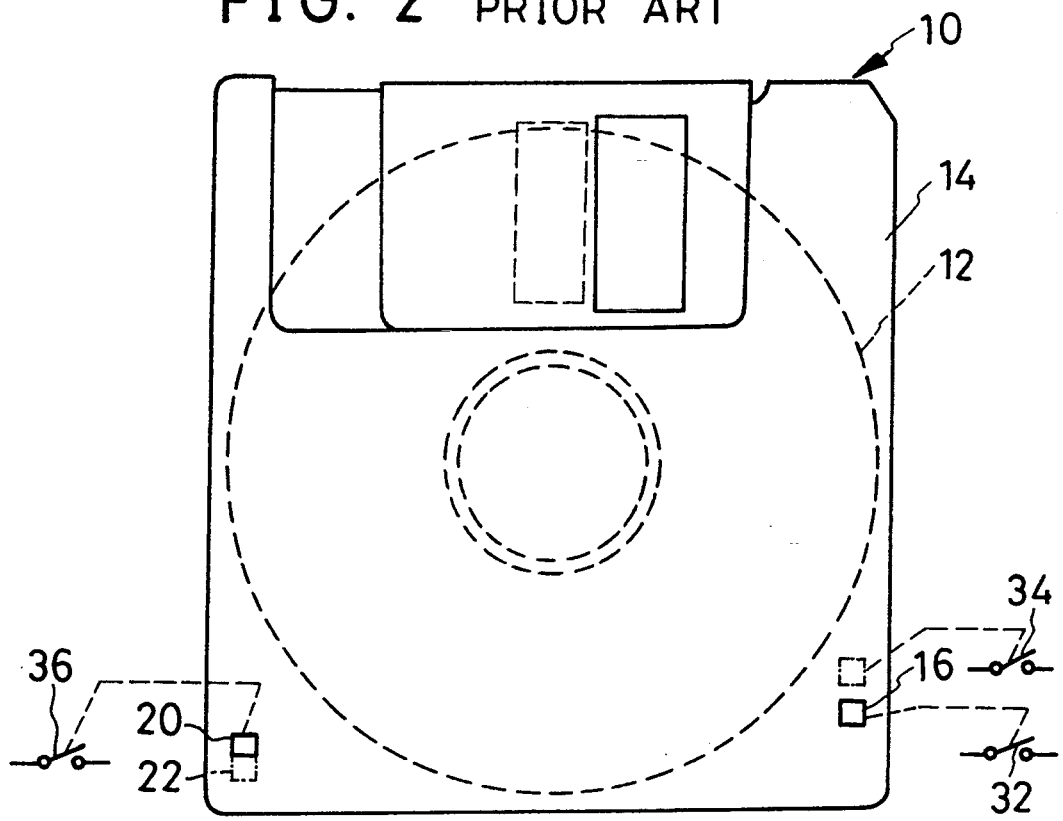
FIG. 2 is a plan view of one disk cartridge suitable for use with the FIG. 1 disk drive.
Figure 3:
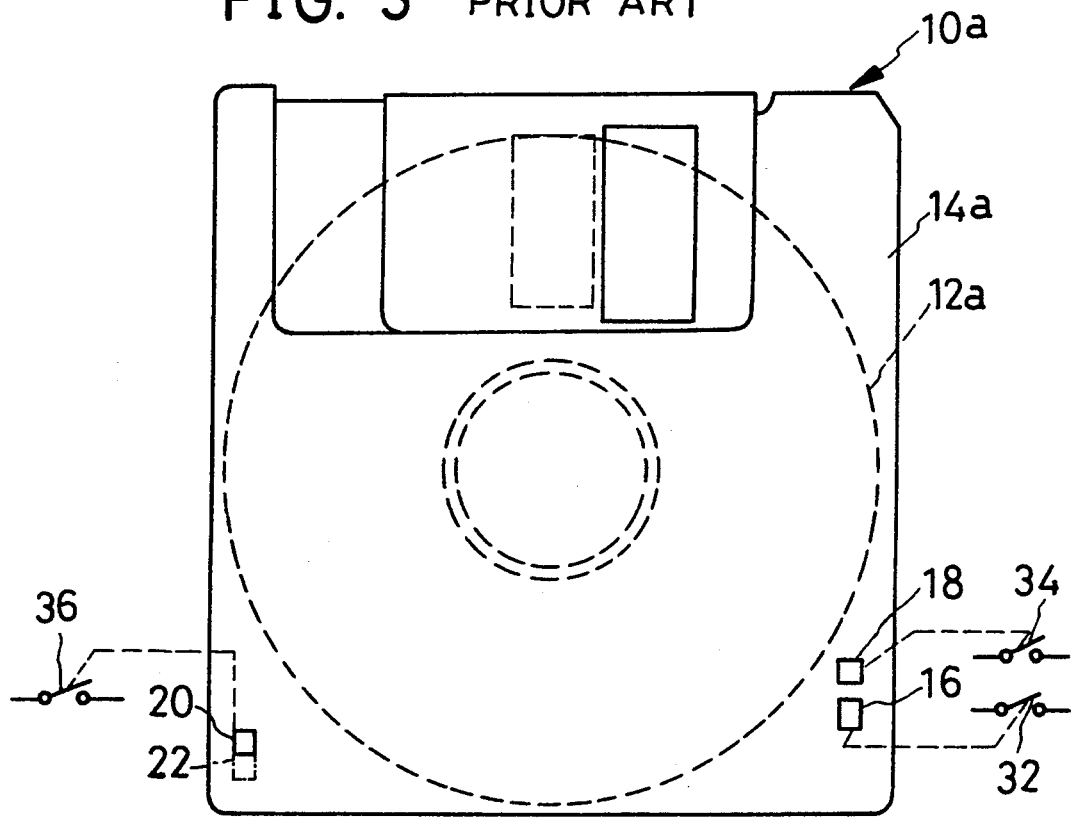
FIG. 3 is a plan view of another disk cartridge suitable for use with the FIG. 1 disk drive.

As will be noted from FIGS. 2 and 3, the two- and four-megabyte disk cartridges 10 and 10a are alike in having flexible magnetic disks 12 and 12a of the same shape and size rotatably housed in protective envelopes 14 and 14a of the same shape and size. The two disk cartridges do differ, however, in that the two-megabyte disk cartridge 10 has but one window 16 adjacent the right, bottom corner, as viewed in FIG. 2, of its envelope 14 whereas the four-megabyte disk cartridge 10a has a second window 18 in addition to the first window 16 lying in the same position on its envelope 14a as does the window 16 on the envelope 14 of the two-megabyte disk cartridge. The unshown one-megabyte disk cartridge has no such windows.

The two- and four-megabyte disk cartridges 10 and 10a, as well as the unshown one-megabyte disk cartridge, are also alike in having a file protect window 20 in the same position on their envelopes 14 and 14a. The file protect window 20 can be opened or closed by a cover 22.

With reference back to FIG. 1 the disk drive has a first disk capacity sensor 24 for sensing the presence or absence of the first disk capacity window 16, a second disk capacity sensor 26 for sensing the presence or absence of the second disk capacity window 18, a file protect sensor 28 for sensing whether the file protect window 20 is open or closed, and a disk loading sensor 30 for sensing the loading and unloading of a disk cartridge, whichever capacity it may be of.

In practice, the two disk capacity sensors 24 and 26 and the file protect sensor 28 may take the form of Microswitches (trade name) comprising contact pairs 32, 34 and 36 and switch actuators 38, 40 and 42, respectively. The contact pairs 32, 34 and 36 are closed when the switch actuators 38, 40 and 42 are admitted into the windows 16, 18 and 20, respectively, and open otherwise.

In order to obtain a signal indicative of whether the first disk capacity sensor switch 32 is open or closed, this switch is connected to a supply terminal 44 on one hand and, on the other hand, connected to a NOT circuit or inverter 46 via a resistor 48. The inverter 46 on going low serves to substantially ground the resistor 48, so that the desired signal is produced on an first disk capacity sensor output line 50 extending from a line between switch 32 and resistor 48. On going high, on the other hand, the inverter 46 interrupts current flow through the switch 32 and resistor 48.

Thus the inverter 46 is intended to serve as power saving switch for the first disk capacity sensor 24. For minimal power consumption, the inverter 46 should be of the known complementary metal oxide semiconductor (CMOS) construction comprising field effect transistors in integrated circuit form.

Similarly, the switch 34 of the second disk capacity sensor 26 is connected to a supply terminal 52 on one hand and, on the other hand, to the inverter 46 via a resistor 54. The output line 56 of the second disk capacity sensor 26 is connected to the midpoint between switch 34 and resistor 54. Thus the inverter 46 functions as power saving switch for both first 24 and second 26 disk capacity sensors.

The switch 36 of the file protect sensor 28 is grounded on the one hand and, on the other hand, connected to another inverter 58 via a resistor 60. A CMOS inverter is also recommended for use here. The output line 62 of the file protect sensor 28 is connected to the midpoint between switch 36 and resistor 60.

The power consumption of the disk loading sensor 30 can be reduced by substantially the same method as for the disk capacity sensors 24 and 26 and the file protect sensor 28. However, the means for that purpose are not shown as such means fall outside the scope of this invention.

In FIG. 1 is shown the disk cartridge 10 replaceably mounted in its working position on a turntable 64 for data transfer with a magnetic transducer 66. This transducer is to be moved across a multiplicity of annular, concentric tracks, not shown, on the disk 12 and positioned on any required one thereof. The transducer positioning mechanism customarily employed to this end is not shown because of its well known nature and its impertinence to the present invention.

It is understood that the turntable 64 is conventionally provided with a spindle for centering engagement in a central hole in the disk 12 and with a drive pin for driving engagement in an eccentric opening in the disk. A disk drive motor 68 is shown coupled directly to the turn-table 64 for imparting rotation thereto and thence to the disk 12 within the cartridge envelope 14.

The transducer 66 is electrically coupled to a read/write circuit 70. This circuit comprises read circuit means for recreating data that has been read on the disk by the transducer 66, and write circuit means for producing a write current representative of data to be written, for delivery to the transducer 66.

The disk drive conventionally operates under the control of a host system 72. Among the numeral standard signal lines connecting the disk drive and the host system via an interface, not shown, those pertinent to the present invention are a WRITE DATA line 74, WRITE GATE line 76, READ DATA line 78, DRIVE SELECT line 80, MOTOR ON line 82, FILE PROTECT line 84, first DISK CAPACITY line 86, and second DISK CAPACITY line 88. An explanation of these signal lines follows.

The WRITE DATA line 74 is for delivery to the read/write circuit 70 of the data to be written on the disk 12 of the two-megabyte disk cartridge 10 or on those of other capacity disk cartridges to be interchangeably loaded on the turntable 64. The WRITE GATE line 76 is for delivery to the read/write circuit 70 of the WRITE GATE signal having a high for permitting writing and a low state for inhibiting writing. The READ DATA line 78 is for delivery of the recreated data from read/write circuit 70 to host 72.

The DRIVE SELECT line 80 connects the host 72 to the inverter 58 for transmission of a DRIVE SELECT signal for selective use of this and one or more additional disk drives that may be connected to the host. The DRIVE SELECT signal is low when commanding the operation of this disk drive. The inverter 58 is connected to the read/write circuit 70, the resistor 60 and some other circuit elements to be set forth presently.

The MOTOR ON line 82 connects the host 72 to a disk drive motor control and drive circuit 90 via an inverter 92 and AND gate 94 for transmission of a MOTOR ON signal for on/off control of the disk drive motor 68. The AND gate 94 has one other input connected to the disk loading sensor 30, and its output is additionally connected to an OR gate 96. This OR gate has another input connected to the inverter 58 for inputting the inverted DRIVE SELECT signal. The output of the OR gate 96 is connected to the inverter 46. The MOTOR ON signal is low for commanding the operation of the disk drive motor 68.

The FILE PROTECT line 84 connects the output of a NAND gate 98 to the host 72 for transmission of the FILE PROTECT signal from the sensor 28. The NAND gate 98 has an input connected to the output line 62 of the file protect sensor 28 via an inverter 100, and another input connected to the inverter 58.

The first DISK CAPACITY line 86 connects the output of another NAND gate 102 to the host 72 for transmission of the first DISK CAPACITY signal from the sensor 24. The NAND gate 102 has an input connected to the output line 50 of the first disk capacity sensor 24, and another input connected to the inverter f58.

The second DISK CAPACITY line 88 connects the output of still another NAND gate 104 to the host 72 for transmission of the second DISK CAPACITY signal from the sensor 26. The NAND gate 102 has an input connected to the output line 56 of the second disk capacity sensor 26, and another input connected to the inverter 58. The output lines 50 and 56 of the first 24 and second 26 disk capacity sensors are both additionally connected to the motor control and drive circuit 90 for changing the rotational speed of the disk drive motor 68 according to each particular type of disk cartridge loaded on the turntable 64.

Operation

Let it be assumed that the disk cartridge 10 has been loaded on the turntable 64, and that the complete data processing system, comprising the disk drive and the host 72, has been powered on, with the supply voltage applied to the supply terminals 44 and 52. At (A) in FIG. 4 is shown the MOTOR ON signal on the line 82 to be low from time $t_1$ to time $t_4$, commanding the rotation of the disk drive motor 68, and at (B) is shown the DRIVE SELECT signal on the line 80 to be low from time $t_2$ to time $t_3$, commanding the operation of this disk drive. The disk loading sensor 30 is high until time $t_5$, as at (C) in FIG. 4, because the disk cartridge 10 is assumed to have been loaded.

Since the inverter 58 is high during the $t_2-t_3$ interval, as at (C) in FIG. 4, in response to the low state of the DRIVE SELECT signal, the read/write circuit 70 is enabled by this high output. This same high output is also applied to the file protect sensor circuit comprising the resistor 60 and file protect sensor switch 36; in other words, the file protect sensor 28 is powered during the low state of the DRIVE SELECT signal. There can therefore be obtained on the file protect sensor output line 62 the signal representative of whether the switch 36 is open or closed, that is, whether the loaded disk cartridge is protected against erasure or writing or not. The magnitude of the current flowing through the resistor 60 during the closure of the file protect sensor switch 36 is approximately 0.25 milliampere in the case where a CMOS inverter is employed at 58.

During the high state of the DRIVE SELECT signal, as before time $t_2$ and after time $t_3$ in FIG. 4, the inverter 58 is at ground level. Little or no power is therefore consumed by the file protect sensor 28 when this disk drive is not chosen for operation, regardless of whether the file protect sensor switch 36 is open or closed. The inverter 58 will serve to reduce unnecessary power consumption to an absolute minimum if it is of CMOS construction.

The NAND gate 98, as well as the other two NAND gates 102 and 104, is enabled by the DRIVE SELECT signal only when it is low, commanding the operation of this disk drive. The host 72 need not be informed whether the loaded disk cartridge is protected or not, when the DRIVE SELECT signal is high. When the DRIVE SELECT signal is low, however, the NAND gate 98 will go low in response to the closure of the file protect sensor switch 36, thereby informing the host 72 that writing is possible on the loaded disk cartridge. The NAND gate 98 will be high in all other cases.

The power consumption of two disk capacity sensors 24 and 26, on the other hand, is reduced in the following manner:

As indicated at (E) in FIG. 4, the AND gate 94 is high from time $t_1$ to time $t_4$ because the disk loading sensor 30 is high until time $t_5$, as at (C) in FIG. 4, and because the inverter 92 on the MOTOR ON line 82 is high from time $t_1$ to time $t_4$ in response to the low state of the MOTOR ON signal during that time interval, as at (A) in FIG. 4. The OR gate 96 is therefore high during the $t_1-t_4$ interval, regardless of whether the DRIVE SELECT signal is high or low. Thus the inverter 46 gains ground level thereby grounding the disk capacity sensors 24 and 26 via the respective resistors 48 and 54.

Consequently, the disk capacity sensor output signals on the lines 50 and 56 will be high or low depending upon whether the sensor switches 32 and 34 are closed or open. These disk capacity sensor output signals will be fed both into the disk drive motor control and drive circuit 90 and into the respective NAND gates 102 and 104. The motor control and drive circuit 90 will respond to the input signals by setting the rotational speed of the disk drive motor 68 at a value suiting the loaded disk cartridge of the particular capacity detected.

The NAND gates 102 and 104 input as aforesaid the inversion of the DRIVE SELECT signal, which is assumed to be low only from time $t_2$ to time $t_3$, as at (B) in FIG. 4. The host 72 will therefore be informed of the capacity of the loaded disk cartridge 10 during the $t_2-t_3$ interval.

The AND gate 94 is low when the MOTOR ON signal is high, as before the time $t_1$ and after the time $t_4$ in FIG. 4. Since then the OR gate 96 is also low, the inverter 46 will go high, so that no current will flow through the serial connections of the disk capacity sensor switches 32 and 34 and resistors 48 and 54 even if the switches are closed. The is waste of power can thus be avoided.

Ideally, the supply voltage and the high output from the inverter 46 should be of the same magnitude. Even if a difference exists therebetween, however, only voltages proportional to that difference will be applied to the serial circuits of the sensor switches 32 and 34 and resistors 48 and 54, so that power will nevertheless be saved, though to a less extent.

The power saving switch 46 turns on and off independently of the DRIVE SELECT signal under the conditions given in FIG. 4, in which the DRIVE SELECT signal is low during the low state of the MOTOR ON signal. Possibly, the DRIVE SELECT signal may go low when the MOTOR ON signal is high. Then the OR gate 96 will go high, with the result that the inverter 13 goes low to ground the disk capacity sensors 24 and 26 via the resistors 48 and 54. The sensors will therefore operate normally.

Possible Modifications

Although the present invention has been shown and described in the foregoing in very specific aspects thereof, it is not desired that the invention be limited by the exact details of such disclosure. The following, then, is a brief list of possible modification, alterations and adaptations of the illustrated embodiment which are all believed to fall within the scope of this invention:

1. The resistor 60 associated with the file protect sensor 28 could be connected to a supply terminal, instead of to the inverter 58, via an electronic switch, and this switch could be turned on and off by the inverter 58.

2. Similarly, the resistors 48 and 54 associated with the disk capacity sensors 24 and 26 could be grounded via an electronic switch, instead of being connected to the inverter 46, and this switch could be turned on and off by the OR gate 96.

3. The file protect sensor switch 36 could be connected to a supply terminal instead of being grounded, and the disk capacity sensor switches 32 and 34 could be grounded instead of being connected to the supply terminals.

4. The resistor 60 could also be connected to the output of a CMOS AND gate, instead of to the inverter 58, and the inputs of this AND gate could be connected to the inverter 58 and to the disk loading sensor 30.

5. The resistors 48 and 54 could likewise be connected to the output of a CMOS NAND gate, instead of to the inverter 46, and the inputs of this NAND gate could be connected to the OR gate 96 and to the disk loading sensor 30.

6. The disk capacity sensor 24 and 26 and the file protect sensor 28 could each be a combination of a light source and a photodetector.

What is claimed is:

1. In an apparatus for data transfer with a replaceable disk cartridge under the control of a host system, the disk cartridge having a data storage disk rotatably housed in a protective envelope with a file protect mark indicative of whether the disk is protected or unprotected against writing, a power saving system comprising:
    (a) file protect sensor means for electrically sensing whether the disk cartridge is protected or unprotected against writing;
    (b) input means for inputting from the host system a drive select signal having a first state for holding the apparatus in operation, and a second state for holding the apparatus out of operation; and
    (c) power saving means connected between the file protect sensor means and the input means for holding the file protect sensor means electrically energized when the drive select signal is in the first state, and unenergized when the drive select signal is in the second state.

2. The invention of claim 1 wherein the file protect sensor means comprises:
    (a) a switch to be turned on or off according to whether the disk cartridge is protected or unprotected against writing;
    (b) a resistor connected between the switch and the power saving means; and
    (c) an output line connected to a circuit point between the switch and the resistor.

3. The invention of claim 2 wherein the power saving means comprises an inverter connected between the input means and the resistor of the file protect sensor means.

4. The invention of claim 1 further comprising a gate circuit having an input connected to the file protect sensor means, and a second input connected to the input means, for delivering an output from the file protect sensor means to the host system when the drive select signal is in the first state.

5. In an apparatus for data transfer with a replaceable disk cartridge under the control of a host system, the disk cartridge having a data storage disk rotatably housed in a protective envelope with a file protect mark indicative of whether the disk is protected or unprotected against writing, a power saving system comprising:
    (a) a file protect sensor circuit comprising a switch to be turned on or off according to whether the disk cartridge is protected or unprotected against writing, and a resistor having a first extremity grounded via the switch;
    (b) input means for inputting from the host system a drive select signal having a first state for holding the apparatus in operation, and a second state for holding the apparatus out of operation; and
    (c) a power saving element connected between the input means and a second extremity of the resistor for holding the file protect sensor circuit electrically energized when the drive select signal is in the first state, and unenergized when the drive select signal is in the second state.

6. The invention of claim 5 wherein the first state of the a drive select signal is low, and wherein the power saving element comprises an inverter.

7. The invention of claim 6 further comprising:
    (a) a second inverter connected to a circuit point between the switch and the resistor of the file protect sensor circuit; and
    (b) a NAND gate having a first input connected to the first mentioned inverter, a second input connected to the second inverter, and an output to be connected to the host system.

8. In an apparatus for data transfer with a replaceable disk cartridge under the control of a host system, the disk cartridge having a data storage disk rotatably housed in a protective envelope with a disk capacity mark indicative of the data storage capacity of the disk, a power saving system comprising:
    (a) disk capacity sensor means for electrically sensing the data storage capacity of the disk cartridge from the disk capacity mark;
    (b) first input means for inputting from the host system a drive select signal having a first state for holding the apparatus in operation, and a second state for holding the apparatus out of operation;
    (c) second input means for inputting from the host system a motor on signal having a first state for holding the disk in rotation, and a second state for holding the disk out of rotation; and
    (c) power saving means connected between the disk capacity sensor means and the first and the second input means for holding the disk capacity sensor means electrically energized when the drive select signal is in the first state and when the motor on signal is in the first state, and unenergized when the drive select signal is in the second state and, at the same time, when the motor on signal is in the second state.

9. The invention of claim 8 wherein the disk capacity sensor means comprises:
    (a) a switch to be turned on or off according to the data storage capacity of the disk cartridge, the switch having a first and a second contact;
    (b) power supply means connected to the first contact of the switch;
    (c) a resistor connected between the second contact of the switch and the power saving means; and
    (d) an output line connected to a circuit point between the switch and the resistor.

10. The invention of claim 8 further comprising a gate circuit having an input connected to the disk capacity sensor means, and a second input connected to the first input means, for delivering an output from the file protect sensor means to the host system when the drive select signal is in the first state.

11. In an apparatus for data transfer with a replaceable disk cartridge under the control of a host system, the disk cartridge having a data storage disk rotatably housed in a protective envelope with a disk capacity mark indicative of the data storage capacity of the disk, a power saving system comprising:

(a) power supply means;
(b) a disk capacity sensor circuit for sensing the disk capacity mark of the disk cartridge, the disk capacity sensor circuit comprising a switch to be turned on or off according to the data storage capacity of the disk cartridge, a resistor having a first extremity connected to the power supply means via the switch, and an output line connected to a circuit point between the switch and the resistor;
(c) first input means for inputting from the host system a drive select signal having a first state for holding the apparatus in operation, and a second state for holding the apparatus out of operation;
(d) second input means for inputting from the host system a motor on signal having a first state for holding the disk in rotation, and a second state for holding the disk out of rotation; and
(e) a first inverter connected to the first input means;
(f) a second inverter connected to the second input means;
(g) an OR gate connected to the first and the second inverter; and
(h) a third inverter connected between the OR gate and a second extremity of the resistor of the disk capacity sensor circuit.

12. The invention of claim 11 further comprising a NAND gate having a first input connected to the first inverter, a second input connected to the output line of the disk capacity sensor circuit, and an output to be connected to the host system.

* * * * *